US005275391A

United States Patent [19]

Lynn et al.

[11] Patent Number: 5,275,391

[45] Date of Patent: Jan. 4, 1994

[54] BENCH HOLD-DOWN

[75] Inventors: John S. Lynn, Ottawa; Francis A. McLean, Oxford Station; Edwin C. Tucker, Ottawa; Lloyd Sevack, Nepean; Gary W. Lacoste, Almonte; Timothy C. Frank, Ottawa; Michel Perrier, Orleans; Leonard G. Lee, Ottawa, all of Canada

[73] Assignee: Lee Valley Tools Ltd., Ottawa, Canada

[21] Appl. No.: 927,327

[22] Filed: Aug. 10, 1992

[51] Int. Cl.[5] ................ B23Q 3/02

[52] U.S. Cl. ................ 269/93; 269/94; 269/238

[58] Field of Search ................ 269/91-94; 238

[56] References Cited

U.S. PATENT DOCUMENTS

| | | | |
|---|---|---|---|
| 27,592 | 3/1860 | Cooper | 269/93 |
| 162,866 | 5/1875 | Squire | 269/94 |
| 201,407 | 3/1878 | Gordon | 269/94 |
| 2,877,815 | 3/1959 | Fonken | 269/93 |
| 2,994,236 | 8/1961 | McCormick | 269/94 |
| 3,380,730 | 4/1968 | Carver | 269/94 |
| 3,850,421 | 11/1974 | Orris | 269/91 |
| 3,993,298 | 11/1976 | Marshall | 269/91 |
| 4,084,803 | 4/1978 | Beekenkamp | 269/91 |
| 4,470,586 | 9/1984 | Spencer | 269/94 |

FOREIGN PATENT DOCUMENTS

| | | | |
|---|---|---|---|
| 241243 | 5/1959 | Australia | 269/93 |
| 278666 | 11/1913 | Fed. Rep. of Germany | 269/92 |
| 379885 | 7/1964 | Switzerland | 269/93 |

OTHER PUBLICATIONS

Record Bench Holdfast depicted on p. 93 of the Lee Valley Tools 1991/92 Catalog.

Bench Hold-Down depicted on p. 93 of the Lee Valley Tools 1991/92 Catalog.

Classic Hold-Down depicted on p. 93 of the Lee Valley Tools 1991/92 Catalog.

"C clamp" hold-down depicted in 1992 Wolfcraft work tables brochure.

*Primary Examiner*—Robert C. Watson

*Attorney, Agent, or Firm*—Kilpatrick & Cody

[57] ABSTRACT

A hold-down utilizing a round, interchangeable post having annular barb-like ridges or projections that engage a workbench top through round holes that may be located at substantially any desired positions in the bench top. The post threads into a hold-down body having, on one side of the post, a yoke within which a gooseneck-shaped hold-down arm pivots on a pin received in yoke arms or forks and, on the other side of the post, a screw pressure point and T-shaped slot for receiving the head of a clamping adjustment screw that is journaled through one end of the clamping arm. The other end of the clamping arm terminates in a foot with a rounded pad for exerting pressure against a workpiece.

5 Claims, 1 Drawing Sheet

BENCH HOLD-DOWN

BACKGROUND OF THE INVENTION

This invention relates to woodworking benches and means for temporarily fixing workpieces to such benches.

A wide variety of fixtures and devices for temporarily fixing a workpiece to a woodworking bench have been developed over the years. Among them are hold-downs that press the workpiece against the workbench top or, in some instances, an edge or side of the workbench.

Perhaps the oldest such hold-down, sometimes known as a "classic" hold-down, consists of a single-piece metal apparatus having a straight round post and a gooseneck that extends out and down from the post to terminate in a foot that presses against the workpiece. The post is inserted in a hole in the workbench top and tapped so that the post cocks within the hole in the top as the gooseneck is flexed to apply pressure on the workpiece. The principal disadvantage associated with this type of hold-down is the difficulty of controlling it. It is very difficult to obtain controlled clamping pressure because such a fixture must be manipulated with a hammer. Additionally, use of such a hold-down over time enlarges the hole in the bench at the top and bottom because of repeated impact and wear of the post against the bench hole into which it fits.

A second type of bench hold-down or "holdfast" has a post that is received in a collar that must be permanently mortised and fixed into the workbench top. Ribs cast into the inside of the collar mate with ribs cast on one side of the post in order to prevent its withdrawal from the collar during use. A hold-down arm terminating in a pivotable foot is itself pivotably mounted on a projection from the top of the post and may be adjustably pressed against a workpiece by the action of a handscrew journaled through the end of the arm opposite the foot so that the screw bears against the top of the post causing the arm to pivot down as the screw is advanced. This type of hold-down permits more easily adjusted clamping pressure than the classic hold-down but can be used only where the required mating collar has been mounted in a workbench.

A third type of hold-down is similar in appearance to one-half of a conventional cast iron C-clamp, including the clamping screw but with a body that terminates in a foot that rests against a workbench top and is held in place by a bolt mounted in the bench top. The clamping capacity of this type of hold-down is limited by the length of the clamping screw and height of the clamping body and typically approximates only three to four inches. Additionally, clamping pressure can be applied only to a portion of a workpiece close to its edge because the reach of this type of hold-down is very limited. Like the pivoting hold-down described above, the clamping type of hold-down can be used only in positions where the securing fixture or bolt have been located in a workbench.

A fourth type of hold-down, somewhat similar to the clamp-type described above, substitutes a smooth round post for a portion of the clamp body, which post is received in a hole in the workbench top. Because the post is smooth, it is held in place solely by the limited friction between the post and the sides of a hole in the bench top, and the post must tilt in order to do so. As a consequence, however, it works well only with relatively thin bench tops that have hole diameters adequate to permit the desired tilt. Such hold downs will not work at all, however, if the hole is too large because the post will simply slip within the hole. Additionally, because the arm in this type of hold-down is rigidly fixed to the post, advancing the screw that applies force against the workpiece through a pad or foot on the end of the screw tends to cause the substantial friction between the foot and the workpiece to resist further canting of the post in the workbench top hole. This can cause the post to slip in the workbench.

SUMMARY OF THE INVENTION

The hold-down of the present invention utilizes a round, interchangeable post having annular barb-like ridges that engage the workbench top through round holes that may be located at substantially any desired positions in the bench top. The post threads into a hold-down body having, on one side of the post, a yoke within which a hold-down arm pivots on a pin received in yoke arms or forks and, on the other side of the post, a screw pressure point and T-shaped slot for receiving the head of a clamping adjustment screw that is journaled through one end of the clamping arm. The other end of the clamping arm, which has a gooseneck shape, terminates in a foot with a rounded pad for exerting pressure against a workpiece.

It is thus an object of the present invention to provide a versatile woodworking hold-down fixture that may be easily positioned in numerous locations on a workbench top or edge, may be used to clamp a wide variety of workpiece sizes because of its substantial reach and ability to utilize interchangeable posts of virtually any desired length and which may be easily positioned and repositioned to apply highly controllable pressure to a workpiece.

These and other objects and advantages of the present invention will become apparent by reference to the figures, the following detailed description of the drawings and the claims.

DETAILED DESCRIPTION OF THE DRAWINGS

Figure 1:
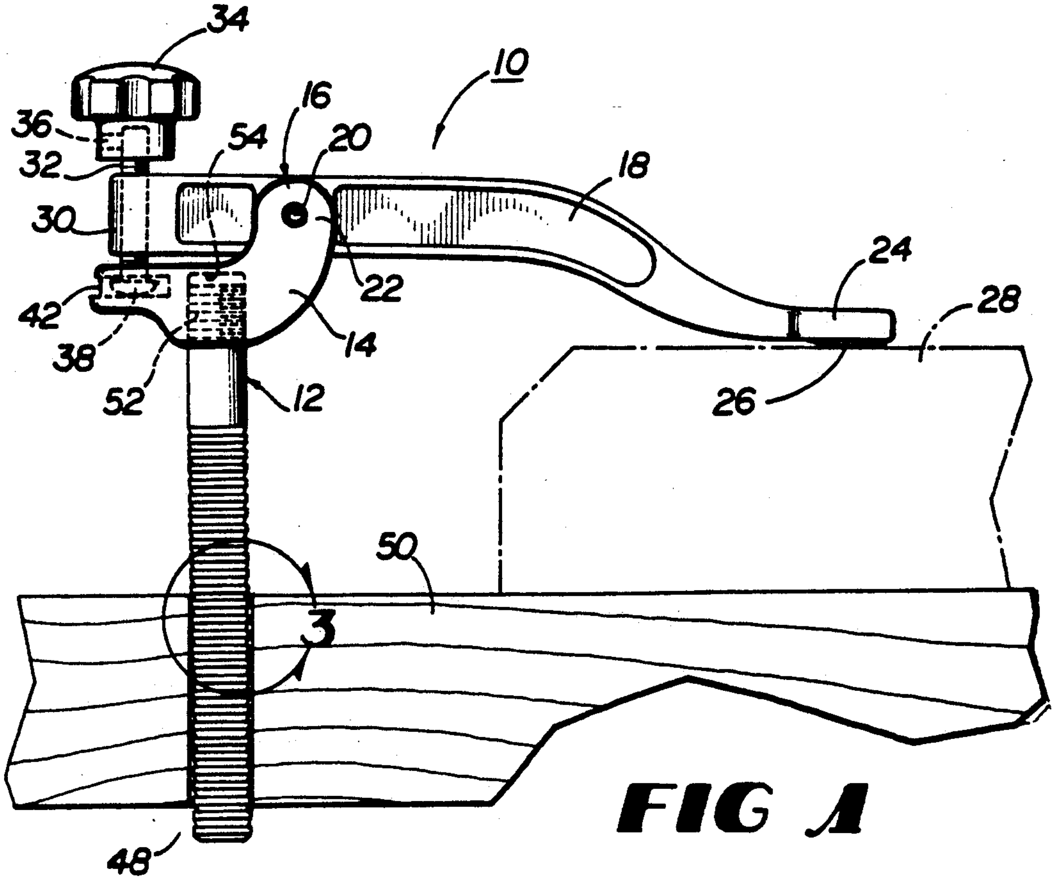
FIG. 1 is a side elevation view of the hold-down of the present invention shown positioned clamping a workpiece to a bench top.
Figure 2:
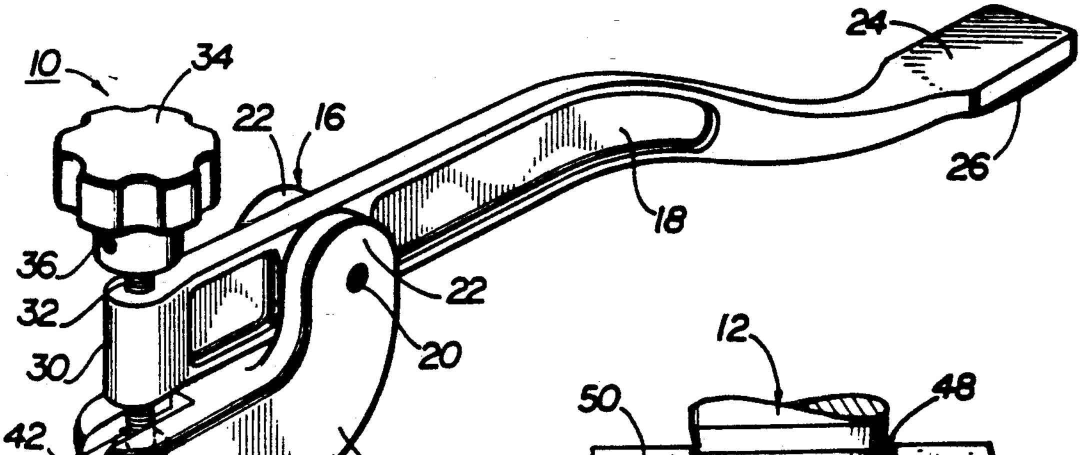
FIG. 2 is a perspective view of the hold-down shown in FIG. 1 with a portion of the post shown broken away.

The hold-down 10 of the present invention includes a post 12 threaded into a hold-down body 14 that forms a yoke 16 within which hold-down arm 18 pivots on a pin 20 that passes through the forks 22 of yoke 16. Gooseneck shaped arm 18 terminates in a foot 24 having a rounded pad 26 that bears against the workpiece 28. The opposite or clamping screw end 30 of arm 18 is bored and threaded to receive clamping screw 32 that is rotated by a knob 34 fixed on one end of screw 32 with set screw 36. Clamping screw 32 terminates opposite knob 34 with a rounded-over head 38 that bears against the bearing surface 40 of body 14, which is located on the other side of post 12 from the pivot point of arm 18 on pin 20 in yoke 16. Bearing surface 40 is the bottom of a T-shaped slot 42 in body 14 within which head 38 of screw 32 is received and retained so that pivoting of arm 18 on pin 20 is limited even when pad 26 of foot 24 is not bearing against a workpiece 28.

Figure 3:
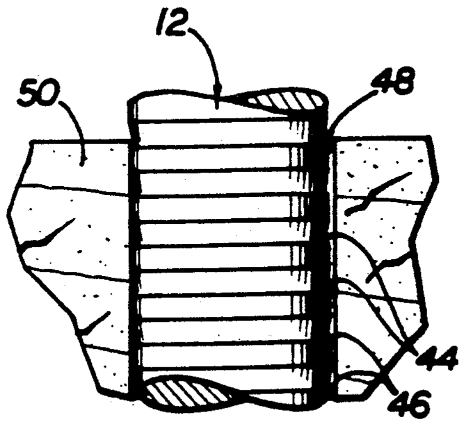
FIG. 3 is an enlarged view of the post of the hold-down taken at circle 3 in FIG. 1.

As may be seen best in FIG. 3, post 12 is formed with annular sloping grooves 44 which leave barb-like projections 46 around post 12 that resist its withdrawal from the hole 48 in bench top 50, within which post 12 of hold-down 10 is positioned. Such barb-like projections 46 substantially enhance the stability of post 12 within hole 48, and prevent withdrawal of post 12 from hole 48 when knob 34 is rotated to cause head 38 of screw 32 to bear against bearing surface 40 of body 14, thereby causing arm 18 to pivot down and apply pressure to workpiece 28 through pad 26 on foot 24. Friction-increasing structures alternative to barb-like projections 46 may also be used on post 12. For instance, post 12 may be knurled, or ridges, threads or other shapes may be formed on its surface to increase friction between post 12 and the sides of hole 48 in top 50.

Because post 12 is attached to body 14 by threads 52 on the end of post 12 and within the post-receiving hole 54 of body 14, post 12 may be easily removed from body 14 for the purpose of substituting a similar post of greater length to permit use of hold-down 10 to fix workpieces of greater size to a bench top.

As will be readily understood by those skilled in the art, the hold-down 10 of the present invention overcomes the shortcomings of previously known hold-down fixtures and can be very easily and conveniently used. Hold-down 10 may be used to secure a workpiece by inserting post 12 in a hole 48 in a workbench top 50 and pressing the entire hold-down 10 toward the workpiece until pad 26 contacts it, which will cause post 20 to cant within hole 48 and lightly clamp workpiece 28 in place. Rotation of knob 34 will then apply additional pressure to workpiece 28 as arm 18 is thereby caused to pivot. The ability to achieve initial clamping pressure without rotating knob 34 that is provided by hold-down 10, particularly because of the barb-like projections 46 on post 12, is especially useful when clamping workpieces vertically against the side of a workbench, as is, typically done, for instance, when shooting the edge of a long board with a hand plane.

The foregoing description of this invention is for purposes of explanation and illustration. It will be apparent to those skilled in the art that modification and changes may be made to this invention as thus described without departing from its scope and spirit.

We claim:

1. A hold-down comprising:

(a) a round post having a longitudinal axis, (b) a body fixed to the post and containing a T-shaped slot, (c) an arm pivotally attached to the body, and (d) means for causing the arm to pivot by exerting pressure on the body at a point removed from the axis of the post comprising a screw threaded into the arm and having a head that is positioned within the slot so that the screw may be rotated to apply pressure through the screw head against the body but substantial movement of the screw head away from the body is resisted by the portions of the body that form the T-shaped slot.

2. The hold-down of claim 1, further comprising annular acute projections on the post to resist withdrawal of the post from a benchtop having a hole into which the post is inserted during use of the hold-down.

3. The hold-down of claim 1, further comprising a foot formed on one end of the arm and having a rounded pad for contact with a workpiece.

4. A hold-down, comprising:

(a) a round post having a longitudinal axis and annular acute projections to resist withdrawal of the post from a benchtop having a hold into which the post is inserted during sue of the hold-down, (b) a body fixed to the post, wherein portions of the body form a T-shaped slot, (c) an arm pivotally attached to the body, further comprising a foot formed on one end of the arm and having a rounded pad for contact with a workpiece, and (d) means for causing the arm to pivot by exerting pressure on the body at a point removed from the axis of the post, comprising a screw threaded into the arm and having a head that is positioned within the slot so that the screw may be rotated to apply pressure through the screw head against the body but substantial movement of the screw head away from the body is resisted by the portions of the body that form the T-shaped slot.

5. A hold-down, comprising:

(a) a round post having annular grooves that form barb-like projections along a portion of the post and threads on one end to be received in (b) a body (i) containing a threaded bore for receiving the threaded end of the post and (ii) forming (x) a yoke comprising two forks positioned on one side of the threaded bore and (y) a bearing surface and a T-shaped slot on the other side of the threaded bore, and (c) a pin that passes through the forks of the yoke and through (d) an arm that pivots on the pin and terminates at one end in a foot having a rounded pad for bearing against a workpiece and contains at its other end a threaded bore within which is journaled (e) a screw having on one end a head that is captured within the T-shaped slot and on its other end (f) a knob for rotating the screw so that the head bears against the bearing surface on the body, thereby causing the arm to pivot as the screw is rotated.

* * * * *